United States Patent
Sugata et al.

(10) Patent No.: US 7,048,481 B2
(45) Date of Patent: May 23, 2006

(54) CUTTING FLUID DEVICE FOR A SPINDLE OF A MACHINE TOOL

(75) Inventors: Shinsuke Sugata, Fukuyama (JP); Tadashi Makiyama, Onomichi (JP)

(73) Assignee: Horkos Corp., Fukuyama (JP)

( * ) Notice: Subject to any disclaimer, the term of this patent is extended or adjusted under 35 U.S.C. 154(b) by 427 days.

(21) Appl. No.: 10/312,668

(22) PCT Filed: Aug. 20, 2001

(86) PCT No.: PCT/JP01/07135

§ 371 (c)(1),
(2), (4) Date: May 9, 2003

(87) PCT Pub. No.: WO02/18097

PCT Pub. Date: Mar. 7, 2002

(65) Prior Publication Data

US 2003/0170087 A1     Sep. 11, 2003

(30) Foreign Application Priority Data

Aug. 28, 2000  (JP) .............................. 2000-257582

(51) Int. Cl.
*B23Q 11/10* (2006.01)
(52) U.S. Cl. ...................... 409/136; 409/135; 409/231; 408/56; 408/57; 408/59
(58) Field of Classification Search ................ 409/136, 409/135, 231; 408/56, 57, 59; B23Q 11/10
See application file for complete search history.

(56) References Cited

U.S. PATENT DOCUMENTS

| 5,004,382 | A | * | 4/1991 | Yoshino | 408/68 |
| 5,378,091 | A | * | 1/1995 | Nakamura | 409/132 |
| 5,676,506 | A | * | 10/1997 | Sugata | 409/136 |
| 5,690,137 | A | * | 11/1997 | Yamada | 137/240 |
| 5,984,595 | A | * | 11/1999 | Mizoguchi | 408/57 |
| 6,305,696 | B1 | * | 10/2001 | Sugata et al. | 279/20 |
| 6,582,167 | B1 | * | 6/2003 | Sugata et al. | 409/136 |
| 6,602,031 | B1 | * | 8/2003 | Hara | 409/131 |
| 6,644,900 | B1 | * | 11/2003 | Sugata et al. | 409/136 |
| 6,899,496 | B1 | * | 5/2005 | Sugata et al. | 409/136 |
| 6,905,294 | B1 | * | 6/2005 | Sugata et al. | 409/136 |
| 6,923,604 | B1 | * | 8/2005 | Sugata et al. | 409/136 |
| 6,926,478 | B1 | * | 8/2005 | Sugata et al. | 409/136 |
| 6,981,825 | B1 | * | 1/2006 | Sugata et al. | 409/136 |

FOREIGN PATENT DOCUMENTS

| JP | 9-239637 | 9/1997 |
| JP | 11-235641 | 8/1999 |
| JP | 2000-158285 | 6/2000 |
| JP | 2001-18147 | 1/2001 |
| JP | 2001-18148 | 1/2001 |

* cited by examiner

*Primary Examiner*—Boyer D. Ashley
*Assistant Examiner*—Eric A. Gates
(74) *Attorney, Agent, or Firm*—Merek, Blackmon & Voorheees

(57) ABSTRACT

A spindle device of a machine tool, which can prevent the liquefaction of atomized cutting fluid in atomized cutting fluid passage downstream of a straightening unit 14, enhance a responsiveness to an ejecting start or stop instruction, and prevent a waste of cutting fluid. The spindle device for a machine tool has atomized cutting liquid passage (e1, e2) each having a single-shape passage section and formed inside the device ranging from the spindle 1 to the tip end of a cutting tool 13 mounted thereto in one piece, and is operated so as to eject atomized cutting tool 13 via the atomized cutting fluid passages (e1, e2), wherein a straightening unit 14 formed with a plurality of small-diameter passages h are provided in the middle of the cutting liquid passages (e1, e2).

8 Claims, 11 Drawing Sheets

A1

A

B1

B

C

CUTTING FLUID DEVICE FOR A SPINDLE OF A MACHINE TOOL

FIELD OF THE INVENTION

The present invention relates to a spindle device of a machine tool, which ejects atomized cutting fluid from the tip of a cutting tool.

BACKGROUND OF THE INVENTION

In machining due to a machine tool, much cutting fluid is supplied into a machining point to cool and lubricate a workpiece or a cutting tool, or to remove cutting chips. In this case, there happen many problems such as environmental pollution due to cutting fluid, a bad influence to human health, a big cost for waste oil disposal of the cutting fluid, shortening span of the cutting tool by supercooling the workpiece, and sliding wear of the cutting tool due to excessive cutting fluid during fine cutting machining. In addition, because much cutting fluid adheres to the cutting chips during machining, the adhered cutting fluid must be removed from the cutting chips in treating or recycling.

To settle these problems, recently, a machine tool that carries out so-called dry cutting has appeared. The dry cutting is what cuts supplying a very small quantity atomized cutting fluid to the machining point.

The applicant has already put a machine tool for carrying out the dry cutting in practice. As shown in FIG. 11, a spindle device of the machine tool is a tool holder 4, to which a cutting tool 13 is fixed, the tool holder being fixed on a spindle 1 through a taper-shank part 5b.

In this case, a straight holder side atomized cutting fluid passage e2 having a single-shape passage section is provided to the tool holder 4. The cutting fluid passage e2 comprises a central hole "d" of a pull-stud 6, an inner hole "f" of a holder inside connecting pipe 8 and a cutting tool inside passage "g" provided to the thickness of the cutting tool 13. Besides, a spindle side atomized cutting fluid passage e1 comprising an inner hole of an inner pipe 3 is provided to the spindle 1. Here, the inner pipe 3 is provided to a rotating center of the spindle 1 and has a single-shape passage section.

While the cutting tool is machining, atomized cutting fluid generated by an atomized cutting fluid generator provided near the spindle 1 is supplied to the base of the cutting fluid passage e1. Then, the atomized cutting fluid passes through the cutting fluid passage e1, thereafter being ejected from the tip of the tool holder 13 through the cutting fluid passage e2.

In the above-mentioned conventional machine tool, the atomized cutting fluid flows inside the cutting fluid passages e1, e2, each having a single-shape passage cross section, toward the tip of the cutting tool 13. Therefore, as shown in FIG. 10A, the velocity vector "i" of flowing atomized cutting fluid, which expresses the velocity of a microelement thereof in each position in the passage section, is the maximum at a passage center and becomes small towards a passage peripheral wall, defining a parabola "m" due to viscosity or friction with a passage wall. The velocity of atomized cutting fluid on the passage peripheral wall surface becomes theoretically zero.

Here, an important thing is that the velocity of atomized cutting fluid in a comparatively thick layer near the passage peripheral surface is fairly small compared with that of the passage center. Therefore, the atomized cutting fluid is liquefied, thereby easily staying on the peripheral wall surface, preventing stable supply of atomized cutting fluid, causing a waste thereof, and besides, reducing responsiveness in changing over a supply or stop instruction thereof.

The present invention aims to provide a spindle device of a machine tool that can cope with the above-mentioned troubles.

SUMMARY OF THE INVENTION

To achieve the above-mentioned purpose, the invention is characterized by a spindle device of a machine tool comprising a spindle, a cutting tool, cutting fluid passages each having a single-shape passage cross section and a straightening unit provided in at least either of the cutting fluid passages. Here, the cutting fluid passages are mounted on the spindle in one piece, and provided within the range from an inner pipe provided at a rotating center of the spindle to the tip of the cutting tool on the tool side. The straightening unit has small-diameter passages comprising three to nine small-diameter passages, with one small-diameter passage in the center and the other small-diameter passages disposed in a circle concentric with the center small-diameter passage. When atomized cutting fluid supplied from the spindle side is ejected from the cutting tool by way of the atomized cutting fluid passages, such ejection is carried out through the straightening unit.

According to this, the flow of atomized cutting fluid is intercepted at a cutting fluid entrance side of the straightening unit temporarily and partially. Then the atomized cutting fluid is divided and flows into each of the small-diameter passages, reaching a cutting fluid exit side of the straightening unit. A flow state of the atomized cutting fluid in each small-diameter passage is nearly equal to the others irrespective of differences in sectional positions in the straightening unit. As a result the rate of flow of the atomized cutting fluid of the whole section in the atomized cutting fluid passage on the cutting fluid exit side of the straightening unit is equalized. Particularly, the rate of flow of the atomized cutting fluid near the passage peripheral wall of the atomized cutting fluid passage is large in downstream of the straightening unit rather than upstream thereof. Such flow contributes to stabilizing the ejection of the atomized cutting fluid from the tip of the cutting tool and enhancing responsiveness to an ejecting start or stop instruction.

Besides, since each adjacent interval between small-diameter passages is distributed so as to be equalized with that of the center or the circumference within the cylindrical section, atomized cutting fluid through the small-diameter passages effectively equalizes the rate of flow on the passage section and enhances the rate of flow near the passage periphery more than that of the entrance side. The straightening unit, as a result of various experiments, effectively equalizes the rate of flow on the passage section and enhances the rate of flow near the passage periphery more than that of the entrance side. Therefore, the ejection of the atomized cutting fluid from the tip of the cutting tool is stabilized, and the responsiveness to an ejecting start or stop instruction is enhanced. Moreover, the invention is characterized by a construction that the straightening unit of the spindle side is provided at the tip of the cutting fluid passage.

In this case, the cutting tool and its associated members that are exchanged and installed on the spindle can remain conventional structures, respectively.

An atomized cutting fluid generator for generating atomized cutting fluid is provided in the cutting fluid passage on the spindle side. According to this, the atomized cutting fluid passage is shortened, thereby preventing liquefaction of the atomized cutting fluid and enhancing responsiveness to an ejecting start or stop instruction. Besides, the small-diameter passages are straight and have the same bore size. According to this, the straightening unit is easily produced, and the ejection of atomized cutting fluid is effectively stabilized.

BRIEF DESCRIPTION OF THE DRAWINGS

FIG. 1A is a sectional view from a side sight, FIG. 1B is an enlarged sectional view showing an important part of the spindle device, and FIG. 1C shows a component of a straightening unit of the spindle device.

FIG. 2A is a sectional view from a side sight, and FIG. 2B is a partly enlarged view.

FIG. 3A is a sectional view from a side sight, and FIG. 3B is a partly enlarged view.

FIG. 4A is a sectional view from a side sight, and FIG. 4B is a partly enlarged view.

FIG. 5A is a sectional view from a side sight, and FIG. 5B is a partly enlarged view.

FIG. 6A is a sectional view from a side sight, and FIG. 6B is a partly enlarged view.

FIG. 7A is a sectional view from a side sight, and FIG. 7B is a partly enlarged view.

FIG. 8A is a sectional view from a side sight, and FIG. 8B is a partly enlarged view.

FIG. 9A is a sectional view from a side sight, and FIG. 9B is a partly enlarged view.

FIG. 10A is a sectional view from a side sight, and FIG. 10A1 is a side view at central site. FIG. 10B is a sectional view from a side sight, and FIG. 10B1 is a side view at a central site. FIG. 10C is a sectional view from a side sight.

PREFERRED EMBODIMENT OF THE INVENTION

First of all, the first embodiment of the invention will be explained.

Figure 1:
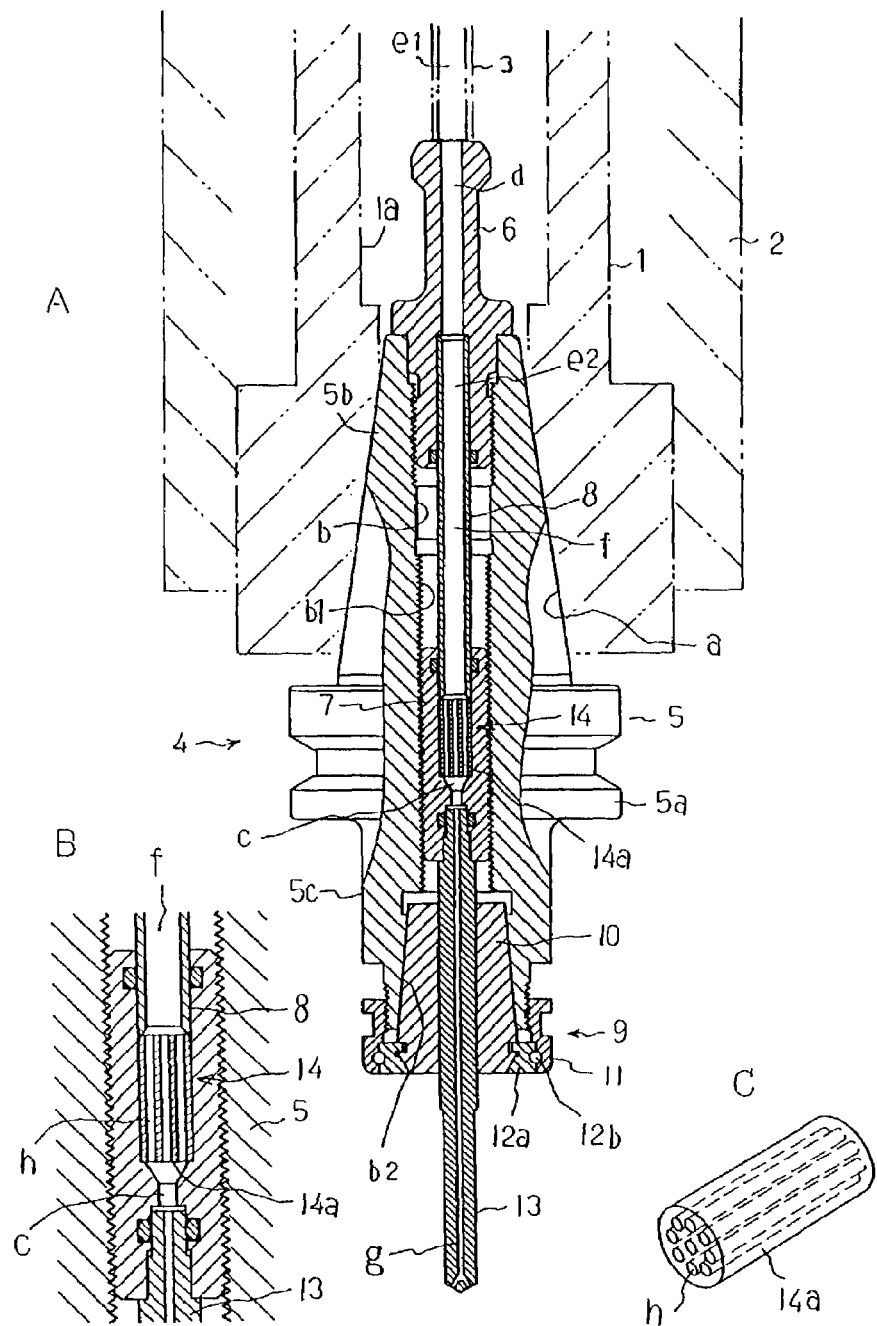
FIG. 1 illustrates a spindle device of a machine tool concerning the first embodiment of the invention.

In FIG. 1, 1 is a bar spindle, which is supported to a spindle support frame 2 of a machine tool by not-illustrated bearings so as to freely rotate around the center of the spindle 1. The spindle 1 has a central hole 1a whose tip forms into a taper hole "a". An inner pipe 3 is fixed at the center of the central hole 1a in one piece with the spindle 1.

Numeral 4 is a tool holder that is attached and detached by a tool exchange device. Here, the middle of a holder body 5 forms into a flange part 5a, a portion behind the flange 5a into a shank part 5b, and a portion in front thereof into a round bar-shape anterior overhang part 5c. Besides, the holder body 5 has an inner hole "b" to the center. A pull-stud 6 screws on the rear end of the inner hole "b". A female screw b1 is formed to the comparatively long range of the anterior part thereof. The forefront part thereof forms into a taper hole b2. Here, an adjusting screw 7 having a male screw on the peripheral surface is screwed into the female screw b1.

The adjusting screw 7 has an inner hole "c" whose rear is connected to a central hole "d" of the pull-stud 6 through a holder inside connecting pipe 8.

A collet fastener 9 is provided at the tip of the overhang part 5c. The fastener 9 comprises a collet 10 inserted into the taper hole b2 of the holder body 5, a fastening nut 11 screwed on the tip of the overhang part 5c, and ring-shape coupling members 12a and 12b for combining the nut 11 with the collet 10 relatively-movably in a circumferential direction of the collet 10. A cutting tool 13 is inserted into the central hole of the collet 10. The cutting tool 13 is supported with rearward displacement being restricted by inserting the rear end of the cutting tool 13 into the anterior part of the inner hole "c" of the adjusting screw 7. Besides, the body of the cutting tool 13 is firmly fixed to the center of the holder body 5 by the fastener 9.

The tool holder 4 is firmly mounted on the spindle 1 by closely inserting the taper-shank part 5b into the taper hole "a" as well as pulling the pull-stud 6 rearward with a not-illustrated clamping mechanism provided to the central hole 1a.

In this state, the tip of the inner pipe 3 contacts closely on the rear end surface of the pull-stud 6.

In the above-mentioned construction, an inner hole of the inner pipe 3 serves as a spindle side atomized cutting fluid passage e1. Besides, the central hole "d" of the pull-stud 6, an inner hole "f" of the connecting pipe 8, the inner hole "c" of the adjusting screw 7 and a cutting tool inside passage "g" formed to the thickness of the cutting tool 13 serve as a tool holder side atomized cutting fluid passage e2.

A straightening unit 14 is provided between the front end of the connecting pipe 8 and the rear end of the cutting tool 13 in the inner hole "c" of the adjusting screw 7 in the middle of the cutting fluid passage e2. As shown in FIG. 1C, the straightening unit 14 has longitudinal small-diameter passages "h" in a columnar member 14a closely inserted into the inner hole "c". The passages "h" are arranged adequately.

In this case, the columnar member 14a is made with a diameter of about 5 to 8 mm. Besides, each passage "h" is made with a diameter of about 0.3 to 0.5 mm and made straight so as to go in a central direction of the inner hole "c". These small-diameter passages "h" are 9 pieces in all, and arranged with one small-diameter passage in the center and the other small-diameter passages disposed in a circle concentric with the center small-diameter passage, all the small-diameter passages having the same bore size as each other.

In use of the above-mentioned spindle device, when atomized cutting fluid is needed, a supply start instruction is given to a control section of the machine tool. In connection with this, atomized cutting fluid with pressure of about 0.3 MPa is supplied from a not-illustrated atomized cutting fluid generator provided near the spindle device at the rear end of the cutting fluid passage e1. The atomized cutting fluid reaches the inside of the cutting fluid passage e2, and is ejected from the tip of the cutting tool 13 by way of the connecting pipe 8, the straightening unit 14 and the passage "g". On the other hand, when atomized cutting fluid is not needed, a supply stop instruction is given to the control section of the machine tool. In connection with this, supply of atomized cutting fluid from the atomized cutting fluid generator to the cutting fluid passage e1 is stopped.

Another embodiment is explained in order below. In this case, in the explanation and each drawing relevant to each embodiment, the same sign shall be used for the substantial same parts as the above-mentioned parts.

Figure 2:
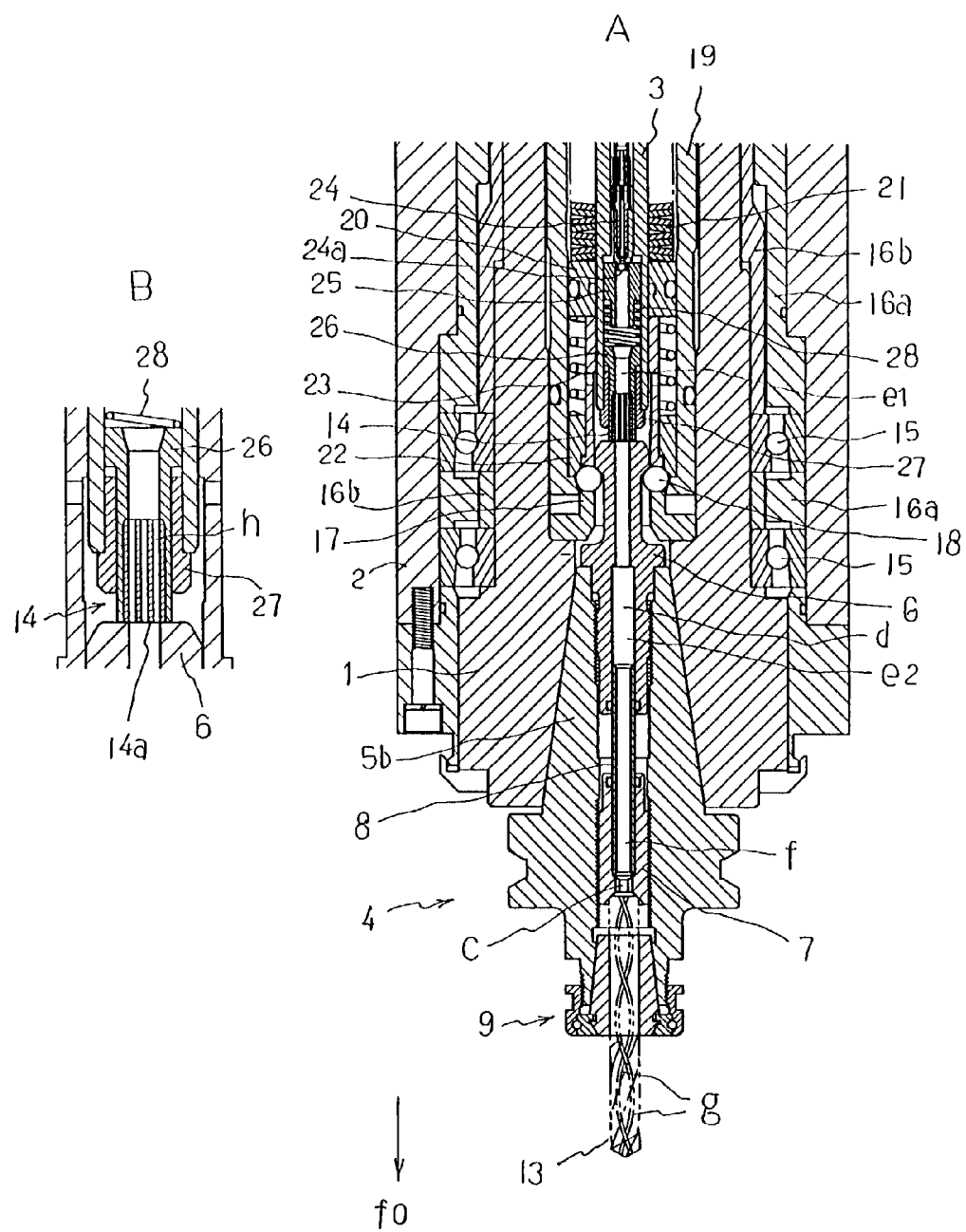
FIG. 2 illustrates a spindle device of a machine tool concerning the second embodiment of the invention.

The second embodiment of the invention will be explained. FIG. 2 is a sectional view from a side sight, which illustrates a spindle device of a machine tool regarding this embodiment.

In the figure, between a spindle 1 and a spindle support frame 2, are provided bearings 15, 15 for supporting the spindle 1 rotatively, and spacers 16a, 16a for regulating the relative position of the spindle 1, the spindle support frame 2 and the bearings 15, 15.

Numeral 17 is a canister inserted into the anterior part of the parallel part of the central hole 1a of the spindle 1, which has one or more through holes in a radial direction on the peripheral wall. A ball member 18 is guided inside each of the through holes movably in the radial direction of the peripheral wall. To the peripheral wall of the canister 17, is extrapolated a cylindrical clamp rod 19 guided to the central hole 1a of the spindle 1 movably in a longitudinal direction. When the clamp rod 19 moves to the front f0 to the spindle 1, the ball member 18 can move outside a radial direction of the spindle. Conversely, when the clamp rod 18 moves backward to the spindle 1, the ball member 19 is pushed by the tip of the clamp rod 19, and moved inside the radial direction of the spindle compulsorily.

A spring receptive ring member 20 is fitly inserted into the rear end surface of the canister 17 between an inner pipe 3 and the clamp rod 19. The ring member 20 is pressed to the rear end surface of the canister 17 by a compressed disk spring group 21 mounted behind it, and keeps the position.

A pressing ring member 22, which presses the ball member 8 with the slanting surface, is fitly inserted into the anterior part between the canister 17 and the clamp rod 19 movably in a longitudinal direction to the clamp rod 19. A compressed spring 23 is installed between the ring member 22 and the ring member 20. The ball member 18 is pressed inside the radial direction of the spindle by the spring 23. The pressure acts on supporting a tool holder 4 suitably lest the tool holder 4 should come out the spindle 1 by self-weight when the clamp rod 19 moves to the front f0 to the spindle 1.

An atomized cutting fluid generator 24 is provided somewhat deep inside the inner hole of the inner pipe 3. Cutting fluid and compressed air are independently supplied to the generator 24 through the inner hole of the inner pipe 3 behind it. The generator 24 mixes and stirs the cutting fluid and the compressed air to generate atomized cutting fluid, and ejects it from an opening 24a of the front end.

The portion before the generator 24 inside the inner hole of the inner pipe 3 has a somewhat large diameter. A cylindrical compressed air supply valve 25 is inserted near the front of the generator 24 inside the anterior part movably in a longitudinal direction. Besides, an extended connecting pipe member 26 is installed inside the tip of the anterior part of the inner pipe 3 through an emission preventing cylindrical member 27 movably in a longitudinal direction within the fixed limits. Moreover, a compressed spring 28 is provided between the connecting pipe member 26 and the valve 25.

In this case, the spring 28 presses the valve 25 backward as well as the connecting pipe member 26 to the front f0. The valve 25 moves to the front when the pressure inside the anterior part of the inner pipe 3 goes down, thereby flowing the compressed air of the generator 24 side into the inner hole of the valve 25.

Here, the tool holder 4 is made with the structure that a straightening unit 14 is gotten rid of in the above-mentioned embodiment.

In the above-mentioned construction, when mounting the tool holder 4 separated from the spindle 1 thereon, a taper-shank part 5b of the tool holder 4 is pushed in a taper hole "a" of the spindle 1 under the clamp rod 19 moving to the front f0. Therefore, a pull-stud 6 pushes and displaces the ball member 18 outside the radial direction of the spindle to enter the position shown in FIG. 2 to the canister 17. After this approach, the clamp rod 19 is pulled to move backward. Therefore, the ball member 18 is pushed inside the radial direction of the spindle, so that tension of the clamp rod 19 is communicated to the pull-stud 6. Accordingly, the tool holder 4 is firmly fixed on the spindle 1.

On the other hand, when separating the tool holder 4 fixed on the spindle 1 therefrom, the tool holder 4 is drawn out to the front f0 under the clamp rod 19 moving to the front f0. Therefore, the pull-stud 6 pushes and moves the ball member 18 outside the radial direction of the spindle against the spring 23 to get out to the front.

In the above-mentioned construction, the portion before the generator 24 inside the inner hole of the inner pipe 3 serves as a spindle side atomized cutting fluid passage e1. A central hole "d" of the pull-stud 6, an inner hole "f" of the connecting pipe 8, an inner hole "c" of an adjusting screw 7 and a cutting tool inside passage "g" provided to the thickness of a cutting tool 13 serve as a tool holder side atomized cutting fluid cutting fluid passage e2.

The above-mentioned technical method is almost equal to what was disclosed on the prior application by this applicant (Japanese Patent Application No. 196231 of 1999).

In this embodiment, the straightening unit 14 is provided between the generator 24 and the tool holder 4 inside the spindle 1. The straightening unit 14 is whet a columnar member 14a such as shown in FIG. 1C interiorly fitted and fixed to the front end part of the inner hole of the connecting pipe member 26 so that small-diameter passages "h" are arranged in the same direction as the center of the cutting fluid passage e2 or the cutting fluid passage e1.

While the tool holder 4 is fixed on the spindle 1, the front end surface of the columnar member 14a is pushed by the pull-stud 6 to move a little backward against the spring 28, and then, pressed closely to the rear end surface of the pull-stud 6 by the spring 28. Therefore, each small-diameter passage "h" connects the cutting fluid passage e1 to the cutting fluid passage e2.

On the other hand, while the tool holder 4 is pulled out the spindle 1, the columnar member 14a is pushed to the front by the spring 28 together with the connecting pipe member 26. Here, the columnar member 14a moves to an anterior regulated position of the moving range of the connecting pipe member 26.

In use of the above-mentioned spindle device, when atomized cutting fluid is needed, a supply start instruction is given to a control section of the machine tool. In connection with this, compressed air and cutting fluid are supplied to the generator 24 inside the spindle 1 from the outside of the spindle device. Therefore, the generator 24 supplies atomized cutting fluid with pressure of about 0.3 MPa into the cutting fluid passage e1. The atomized cutting fluid shortly reaches the inside of the cutting fluid passage e2, and is ejected from the tip of the cutting tool 13 through the connecting pipe 8 and the passage "g". On the other hand, when the atomized cutting fluid becomes useless, a supply stop instruction is given to the control section of the machine tool. In connection with this, the compressed air and the cutting fluid are stopped supplying to the generator 24. Therefore, the generator 24 stops generating atomized cutting fluid, thereby stopping supply of atomized cutting fluid to the cutting fluid passage e1.

Figure 3:
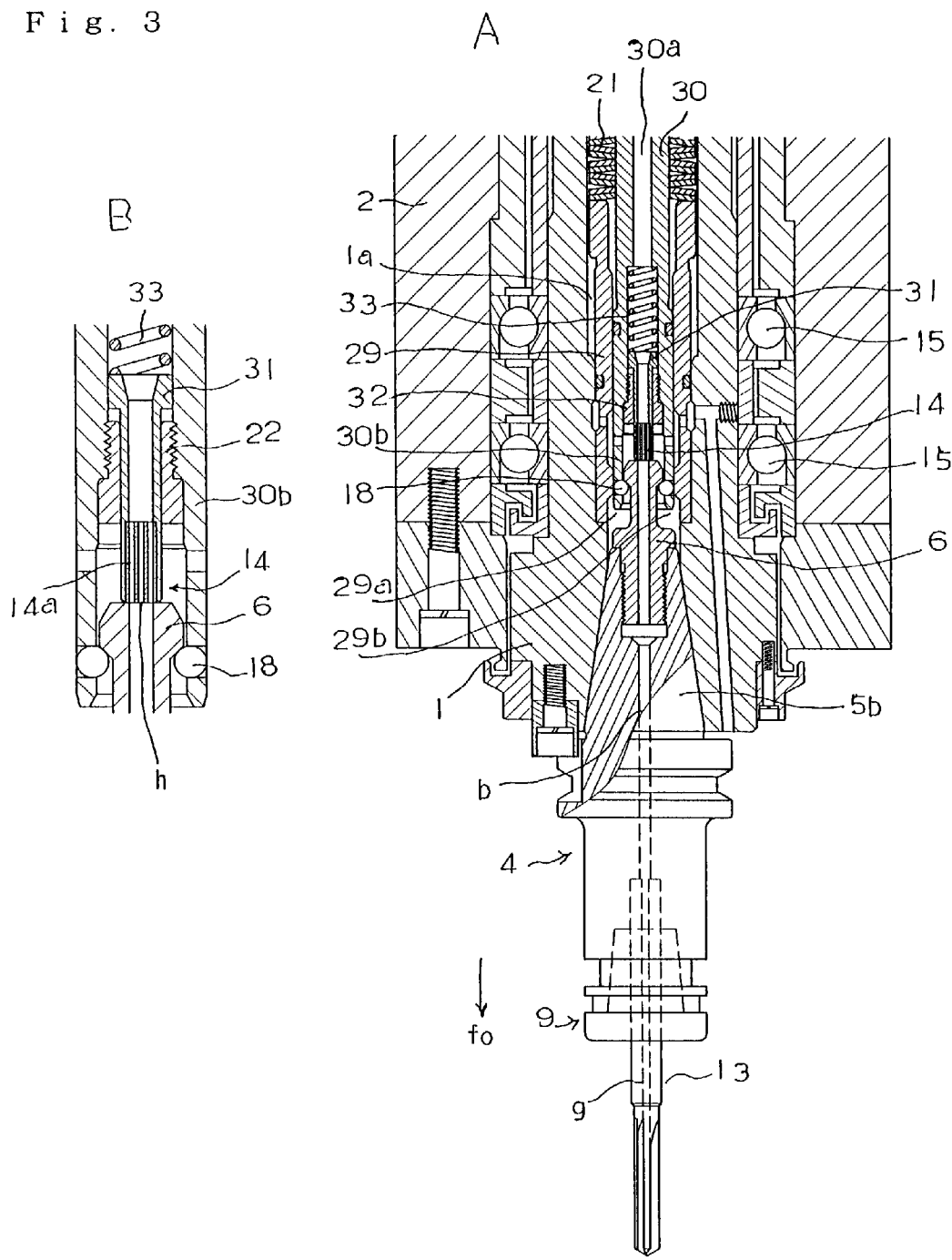
FIG. 3 illustrates a spindle device of a machine tool concerning the third embodiment of the invention.

Next, the third embodiment of the invention will be explained. FIG. 3 is a sectional view, which illustrates a spindle device of a machine tool concerning this embodiment.

As shown in the figure, a canister guide cylindrical member 29 is interiorly fitted close to the foremost parallel part of a central hole 1a of a spindle 1. And a clamp rod 30 is inserted into an inner hole of the guide cylindrical member 29 movably in a longitudinal direction. The clamp rod 30 has a central hole 30a. And the front of the clamp rod 30 forms a canister part 30b. One or more through holes in a radial direction of the spindle are provided in a peripheral wall of the front end of the canister part 30b. A ball member 18 is inserted into each of the through holes movably in the radial direction of the spindle.

A compressed disk spring group 21 is inserted behind the guide cylindrical member 29 inside the central hole 1a of the spindle 1. The spring group 21 presses the guide cylindrical member 29 to the front, and simultaneously presses the clamp rod 30 toward a posterior regulated position within a longitudinal moving range. Therefore, the guide cylindrical member 29 is kept at a position shown in FIG. 3A inside the spindle 1.

An extended connecting member 31 is provided to the central hole 30a behind the canister part 30b of the clamp rod 30. The connecting member 31 is guided through an omission preventing ring member 32 screwed into the central hole 30a movably in a longitudinal direction within the fixed limits, and pressed to the front f0 by a compressed spring 33 mounted behind the ring member 32.

The tool holder 4 is made with a central hole "d" of a pull-stud 6 and a cutting tool inside passage "g" being a*e connected by a central hole "b" of a holder body 5.

In the above-mentioned construction, when installing the tool holder 4 separated from the spindle 1 thereon, a taper shank part 5b of the tool holder 4 is pushed into a taper hole 1a of the spindle 1 with the clamp rod 30 moving to the front f0. Therefore, the pull-stud 6 pushes and moves the ball member 18 outward in the radial direction of the spindle and enters as far as a position shown in FIG. 3A in the guide cylindrical member 29. In this case, the clamp rod 30 moves to the front f0 until the ball member 18 is located inside inward in a front large-diameter part 29a of the inner hole of the guide cylindrical member 29. Then, the clamp rod 30 is pulled backward. Therefore, the ball member 18 is pushed inward in the radial direction of the spindle by a slanting surface 29b behind the large-diameter part 29a to fit in a necking part of the clamp rod 6, thereby communicating backward tension to the pull-stud 6. Accordingly, the tool holder 4 is fixed on the spindle firmly.

On the other hand, when separating the tool holder 4 fixed on the spindle 1 therefrom, the tool holder 4 is pulled to the front f0 with the clamp rod 30 moving to the front f0. Therefore, the pull-stud 6 pushes and moves the ball member 18 outward in the radial direction of the spindle to withdraw to the front f0.

In the above-mentioned construction, the central hole 30a of the clamp rod 30 and a part of the inner hole of the connecting pipe 31 serve as a spindle side atomized cutting fluid passage e1. Besides, the central hole "d" of the pull-stud 6, the central hole "b" of the holder body 5 and the passage "g" provided in the thickness of the cutting tool 13 serve as a tool holder side atomized cutting fluid passage e2. cutting fluid passage e1. Besides, the central hole "d" of the pull-stud 6, the central In the third embodiment as well as the second embodiment, a straightening unit 14 is provided inside the spindle 1. The straightening unit 14 comprises a columnar member 14a such as shown in FIG. 1C interiorly fitted and fixed to the front end part of the inner hole of the connecting pipe member 31 so that the small-diameter passages "h" are arranged in the same direction as the center of the cutting fluid passage e2 or the cutting fluid passage e1.

While the tool holder 4 is fixed on the spindle 1, the front end surface of the columnar member 14a is pushed by the pull-stud 6 to move a little backward against the spring 33, and then, pressed closely to the rear end surface of the pull-stud 6 by the spring 33. Here, each passage "g" connects the cutting fluid passage e1 to the cutting fluid passage e2.

On the other hand, while the tool holder 4 is pulled out the spindle 1, the columnar member 14a is pressed to the front f0 by the spring 33 together with the connecting pipe member 31. Here, the columnar member 14a moves to an anterior regulated position of the moving range of the connecting pipe member 31.

In use of the above-mentioned spindle device, supply of atomized cutting fluid and so on is carried out in accordance with the first embodiment.

Figure 4:
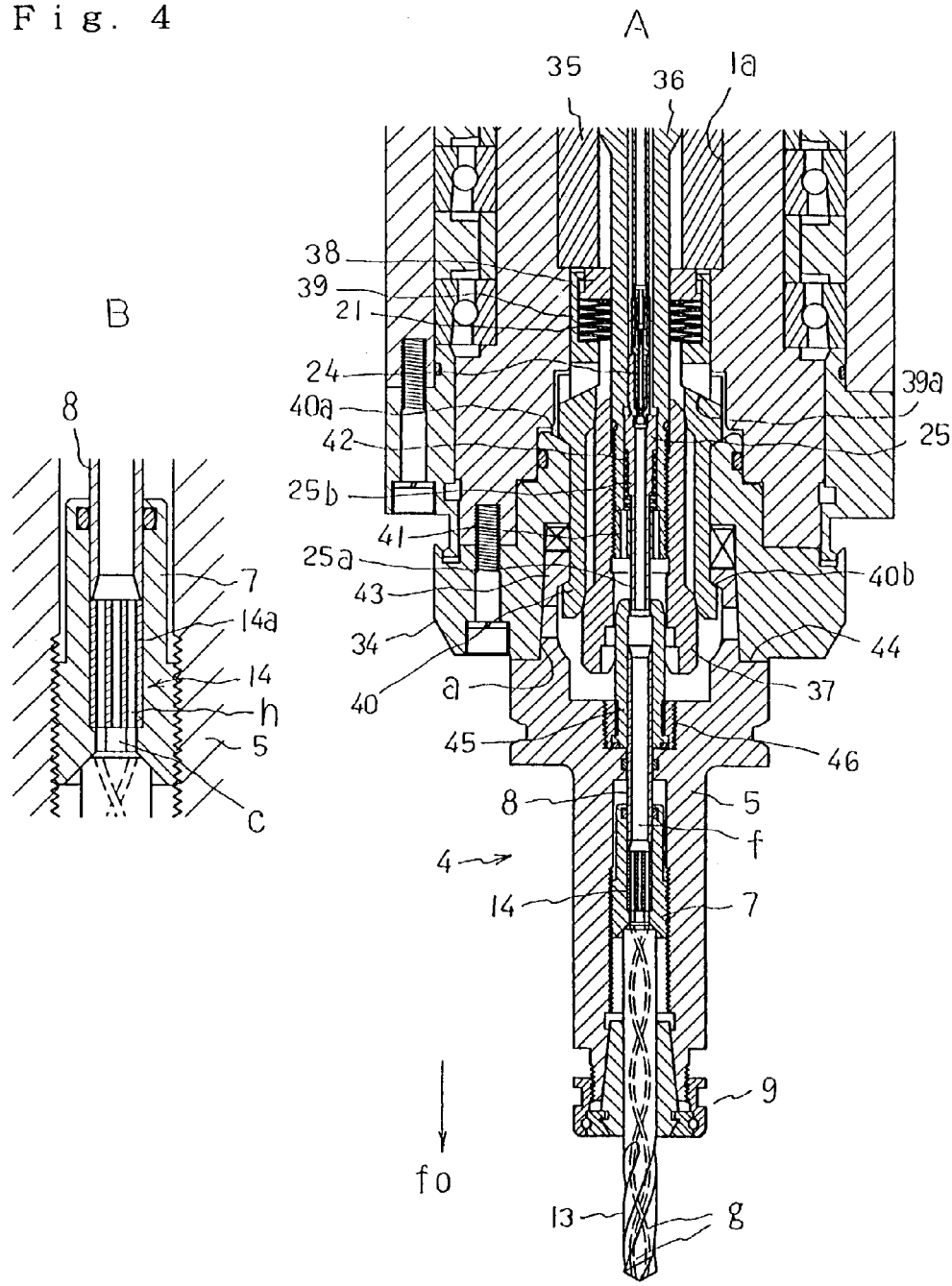
FIG. 4 illustrates a spindle device of a machine tool concerning the fourth embodiment of the invention.

Next, the fourth embodiment of the invention will be explained. FIG. 4 is a sectional view from a side sight, which illustrates a spindle device of a machine tool concerning this embodiment.

As shown in the figure, the front of a central hole 1a of a spindle 1 forms a stepped hole part, and a ring-shape support member 34 is fittingly inserted therein and bolted thereon. An inner hole of the support member 34 forms in a taper hole "a". A cylindrical guide member 35 is fixedly fitted on the interior of the central hole 1a of the spindle 1. A drawbar 36 is inserted into an inner hole of the guide member 35 movably in a longitudinal direction.

A cylindrical clamp member 37 screws on the tip of the draw bar 36. A spring receptacle member 38 is inserted in the central hole 1a between the clamp member 37 and the guide member 35, and besides, a cylindrical press member 39 is inserted therein movably in a longitudinal direction. Besides, a collet 40 is installed between a peripheral surface of the press member 39 and a peripheral wall of the central hole 1a. The posterior part of the inner hole of the press member 39 is made with a large diameter compared with the anterior part thereof. A compressed disk spring group 21 is installed before the receptacle member 38 inside the posterior part. Here, the spring group 21 presses the press member 39 to the front f0 by spring force. Besides, a front slant surface 39a of the press member 39 presses a rear slant surface 40a of the collet 40. Pressure of the press member 39 shrinks the diameter of the anterior part of the collet 40. In this case, 41 is a lock screw member screwed on a female screw formed in an central hole of the clamp member 37, which fixedly joins the clamp member 37 and the draw bar 36.

An atomized cutting fluid generator 24 is fixedly provided to the interior of a central hole of the draw bar 36. A central hole 1a before the generator 24 is made with large-diameter part, and a cylindrical compressed air supply valve 25 is installed movably in a longitudinal direction. The periphery of the valve 25 forms in a stepped surface. The foremost narrow-diameter part 25a is inserted into a central hole of the screw member 41 movably in a longitudinal direction. Besides, a compressed spring 42 is installed behind the screw member 41 between an intermediate part 25b and a peripheral wall of the central hole 1a so as to press the valve 25 backward.

A tool holder 4 is a two-plane constrained HSK type having a taper shaft part 43 and a radial surface 44. An extended connecting passage member 45 is inserted in the rear end of a central hole "b" of a holder body 5 at a front end surface inside an inner hole of the taper shaft part 43, thereby fixing the tool holder 4 on the holder body 5 through a cylindrical screw member 46.

In the above-mentioned construction, when installing the tool holder 4 separated from the spindle 1 thereon, the taper shaft part 43 is inserted into the taper hole "a" of the spindle 1 side under the draw bar 36 and the clamp member 37 moving to the front f0, and the radial surface 44 is closely connected with the front end surface of the support member 34 as shown in FIG. 4A. In this case, the tip of the thin-diameter part 25a of the valve 25 is smoothly inserted into an inner hole of the posterior part of the connecting pipe 45 of the tool holder 4 side.

Then, the draw bar 36 is pulled to move backward. Therefore, an anterior enormous part of the clamp member 37 pushes and moves an interior surface of the front end of the collet 40 outside the radial direction of the spindle, thereby pressing an exterior slant surface 40b of the tip of the collet 40 to an interior slant surface of the rear end of the taper shaft part 43. Pressing like this generates power for drawing the taper shaft part 43 backward. The taper shaft part 43 is pressed to the taper hole "a" of the spindle 1 side, and simultaneously the radial surface 44 is pressed to the front end surface of the support member 34. Therefore, the tool holder 4 is firmly fixed on the spindle 1.

On the other hand, when separating the tool holder 4 fixed on the spindle 1 therefrom, the draw bar 36 and the clamp member 37 are moved to the front f0. Therefore, the collet 40 shall not bind the interior surface of the taper shaft part 43. Under this state, the tool holder 4 is drawn to the front f0 to separate from the spindle 1 side.

In the above-mentioned construction, a central hole of the valve 25 serves as a spindle side atomized cutting fluid passage e1, and besides, an inner hole of the connecting member 45, an inner hole "f" of a holder inside connecting pipe 8, an inner hole "c" of an adjusting screw 7 and a holder inside passage "g" formed the thickness of a cutting tool 13 serve as a tool holder side atomized cutting fluid passage e2.

Besides, in this embodiment, a straightening unit 14 is provided inside the tool holder 4. The straightening unit 14 comprises a columnar member 14a such as shown in FIG. 1C interiorly fitted and fixed between the connecting pipe 8 and the cutting tool 13 inside the inner hole "c" of the adjusting screw 7 so that small-diameter passages "h" thereof are arranged in the same direction as the center of the cutting fluid passage e2.

In use of the above-mentioned spindle device, supply of atomized cutting fluid and so on is carried out in accordance with the second embodiment.

Figure 5:
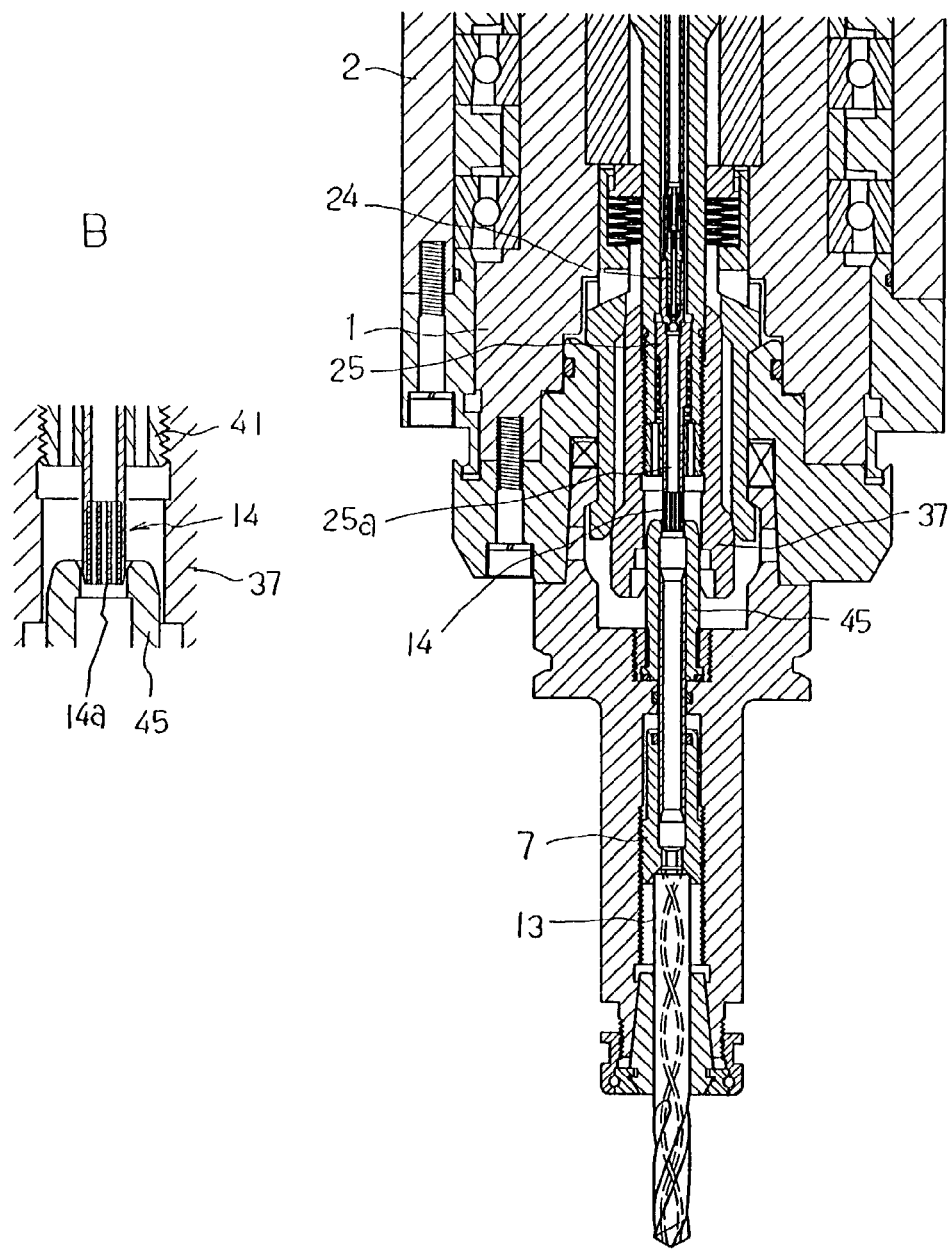
FIG. 5 illustrates a modified example of the fourth embodiment.

FIG. 5 illustrates a modification of this embodiment. In this modification, the straightening unit 14 is provided between the generator 24 and the tool holder 4 inside the spindle 1. Concretely, the columnar member 14a such as shown in FIG. 1C is innerly fitted and fixed inside an inner hole of an anterior thin-diameter part 25a of the valve 25 so that the small-diameter passages "h" are arranged in the same direction as the center of the cutting fluid passage e2 or the cutting fluid passage e1. On the other hand, the straightening unit 14 inside the tool holder 4 is removed.

Figure 6:
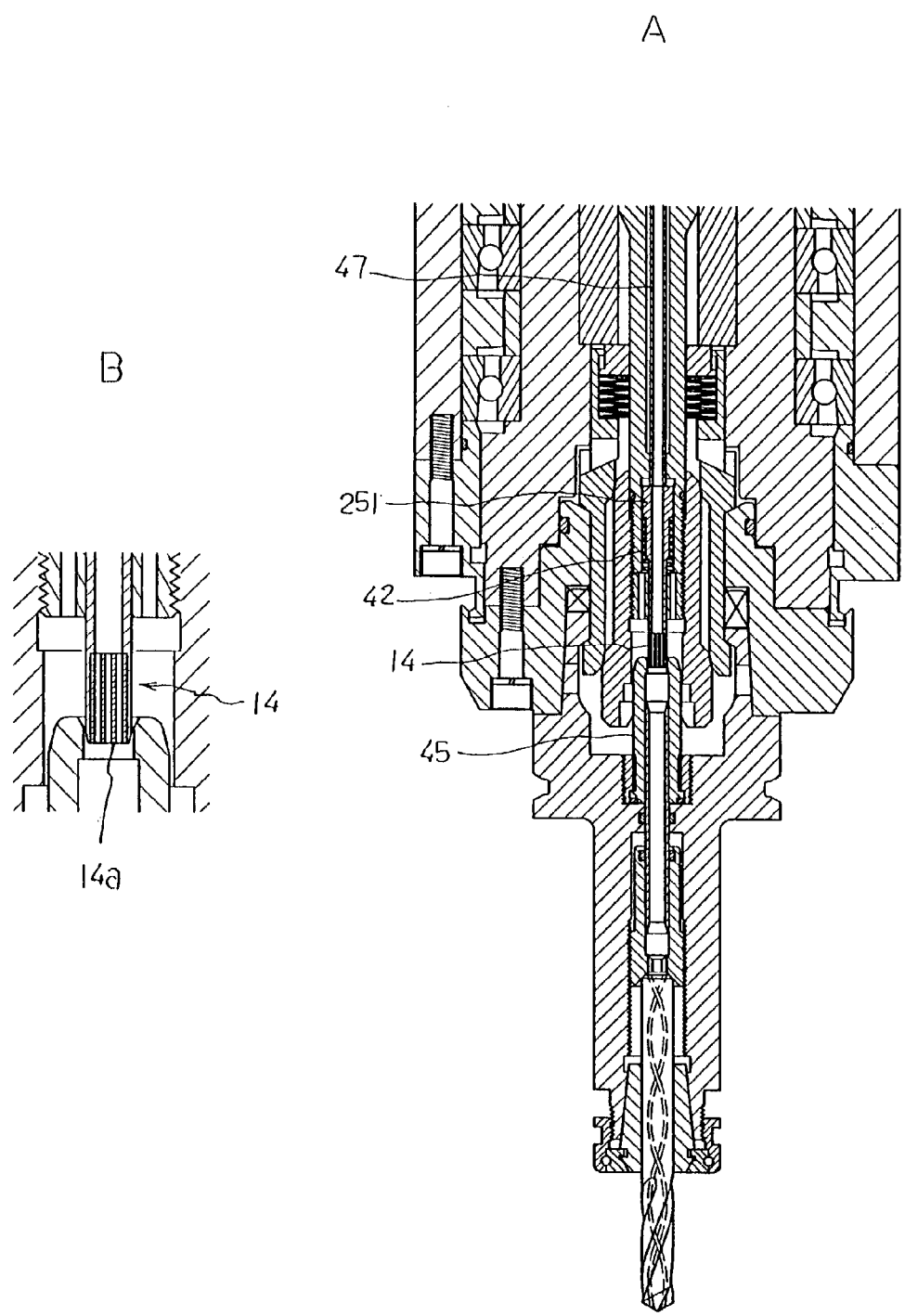
FIG. 6 illustrates another modified example of the fourth embodiment.

FIG. 6 illustrates an another modification of this embodiment. In this modification, the generator 24 and supply passages for supplying compressed air and cutting fluid are removed. An inner pipe 47 is provided inside the central hole of the draw bar 36 in one piece. Besides, instead of the valve 25, an extended connecting pipe member 251 in the same shape with the valve 25 is inserted inside the anterior large-diameter part of the central hole of the draw bar 36 movably in a longitudinal direction. While the tool holder 4 is fixed on the spindle 1, a front end surface of the inner pipe 47 is pressed on a rear end surface of the connecting pipe member 251 by a spring 42, thereby connecting an inner hole of the inner pipe 47 to an inner hole of the connecting pipe member 251. In use of the above-mentioned spindle device, supply of atomized cutting fluid and so on is carried out in accordance with the first embodiment.

Figure 7:
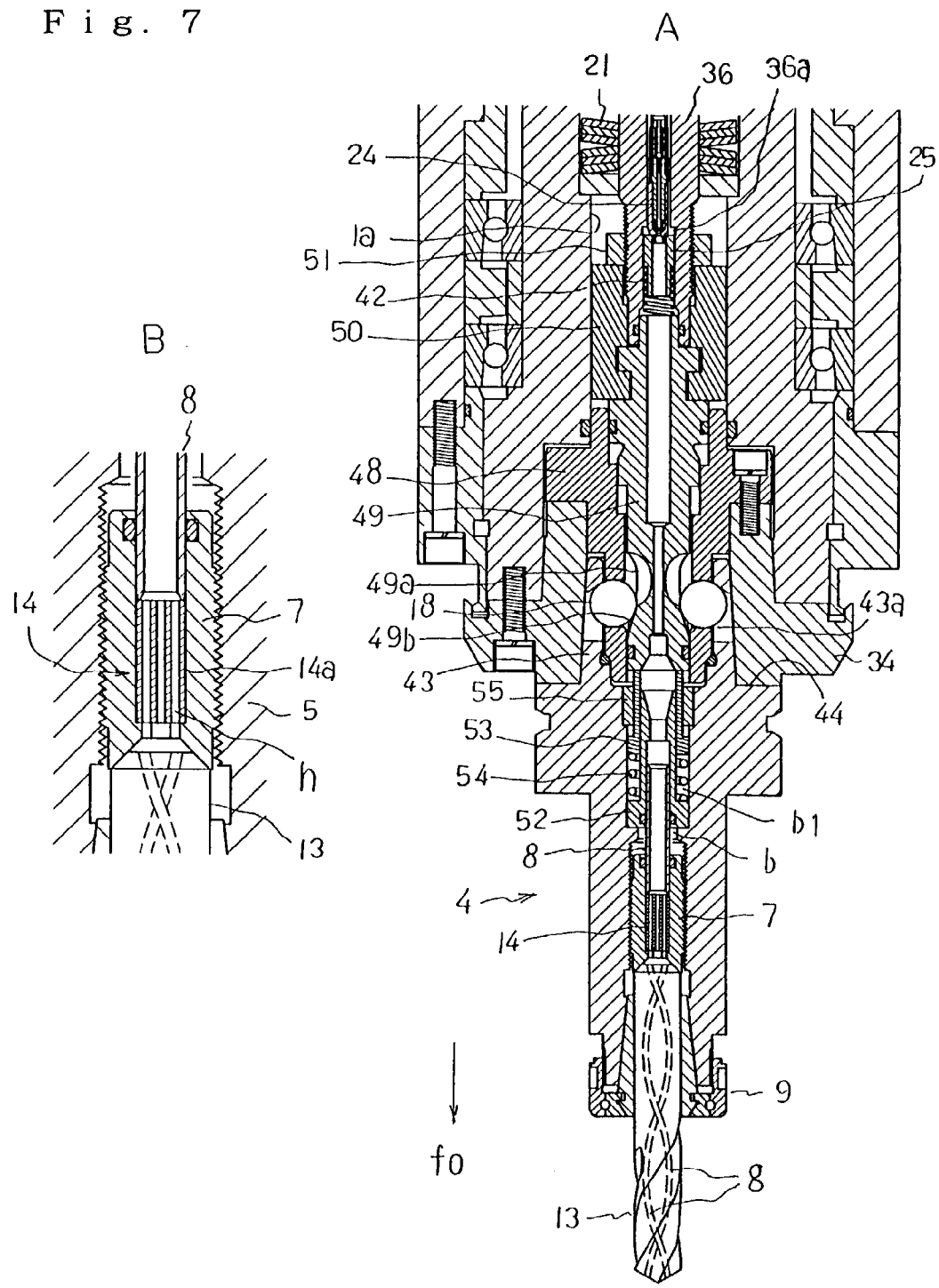
FIG. 7 illustrates a spindle device of a machine tool concerning the fifth embodiment of the invention.

Next, the fifth embodiment of the invention will be explained. FIG. 7 is a sectional view from a side sight illustrating a spindle device of a machine tool concerning this embodiment.

In the figure, an anterior central hole 1a of a spindle 1 is made a large-diameter part into which a ring-shaped support member 34 is fitly inserted and bolted. A cylindrical canister 48 is concentrically bolted to the backside of the support member 34. A clamp member 49 is inserted into an inner hole of the canister 48 movably in a longitudinal direction. A hemispheric hollow 49a and a slant surface 49b are provided to a periphery of the clamp member 49 in relation to a spherical member 18.

A draw bar 36 is inserted to the interior of the central hole 1a of the spindle 1 movably in a longitudinal direction and fitly connected to a rear end of the clamp member 49 through a cylindrical connecting member 50 and a lock nut 51 screwed on the tip thereof. A compressed disk spring group 21 is installed between a peripheral wall of the central hole 1a of the spindle 1 and the draw bar 36 to press the draw bar 36 backward.

An atomized cutting fluid generator 24 is fixedly provided inside a central hole 36a of the draw bar 36. The front of the central hole 36a is made a large-diameter part into which a compressed air supply valve 25 is inserted movably in a longitudinal direction. A compressed spring 42 is installed to the central hole 36a between the valve 25 and a rear end surface of the clamp member 49, pressing the valve 25 backward by elasticity. The central hole 36a of the draw bar 36 and an inner hole of the valve 25 are connected in a straight line.

The posterior part of a central hole "b" of a tool holder 4 of a two-plane constrained KM type is made a large-diameter part b1 into which a passage member 52 connected with the posterior part of a holder inside connecting pipe 8 is inserted. Besides, a mouthpiece 53 is extrapolated to a thin-diameter part of the passage member 52 movably in a longitudinal direction. A compressed spring 54 is installed into the large-diameter part b1 between the mouthpiece 53 and the passage member 52. Here, elasticity of the spring 54 presses the mouthpiece 53 backward, and besides, fixes an engaging ring member 55 for regulating the mouthpiece 53 from getting out the large-diameter part b1 on the rear end of the large-diameter part b1.

In the above-mentioned construction, when installing the tool holder 4 separated from the spindle 1 thereon, a taper shaft part 43 of the tool holder 4 is inserted into a taper hole "a" of the spindle 1 side under the draw bar 36 and the clamp member 49 moving to the front f0. Here, as shown in FIG.

7A, a radial surface 44 is closely connected to a front end surface of the support member 34. In this case, the spherical member 18 moves inside a radial direction of the spindle so as to enter the hemispheric hollow 49a of the clamp member 49, allowing the taper shaft part 43 of the tool holder 4 to enter the taper hole "a" of the spindle 1 side.

Then, the draw bar 36 is drawn backward to move. The slant surface 49b of the clamp member 49 pushes and moves each spherical member 18 outside the radial direction of the spindle 1 side, thereby pressing the spherical member 18 to a slant surface of an engaging hole 43a of the peripheral wall of the taper shaft part 43 as shown in FIG. 7A. Pressing like this generates power for drawing the taper shaft part 43 backward. The taper shaft part 43 is pressed to the taper hole "a" of the spindle 1 side, and simultaneously, the radial surface 44 is pressed to the front end surface of the support member 34. Therefore, the tool holder 4 is firmly fixed on the spindle 1.

On the other hand, when separating the tool holder fixed on the spindle 1 therefrom, the draw bar 36 and the clamp member 37 are moved to the front f0. Therefore, each spherical member 18 moves inside the radial direction of the spindle to enter the hemispheric hollow 49a, thereby not binding the taper shaft part 43. Under this state, the tool holder 4 is drawn to the front f0 to separate from the spindle 1 side.

In the above-mentioned construction, the inner hole of the valve 25 and the central hole of a clamp rod 49 serve as a spindle side atomized cutting fluid passage e1. Besides, an inner hole of the mouthpiece 53, an inner hole of the passage member 52, an inner hole "f" of the connecting pipe 8, an inner hole "c" of an adjusting screw 7 and a holder inside passage "g" formed to the thickness of a cutting tool 13 serve as a tool holder side atomized cutting fluid passage e2.

Besides, in this embodiment, a straightening unit 14 is provided inside the tool holder 4. The straightening unit 14 is made in accordance with the fourth embodiment.

Besides, in use of the above-mentioned spindle device, supply of atomized cutting fluid and so on is carried out in accordance with the second embodiment.

Figure 8:
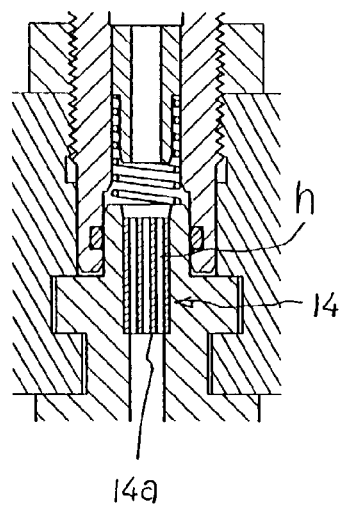
FIG. 8 illustrates a modified example of the fifth embodiment.
Figure 8:
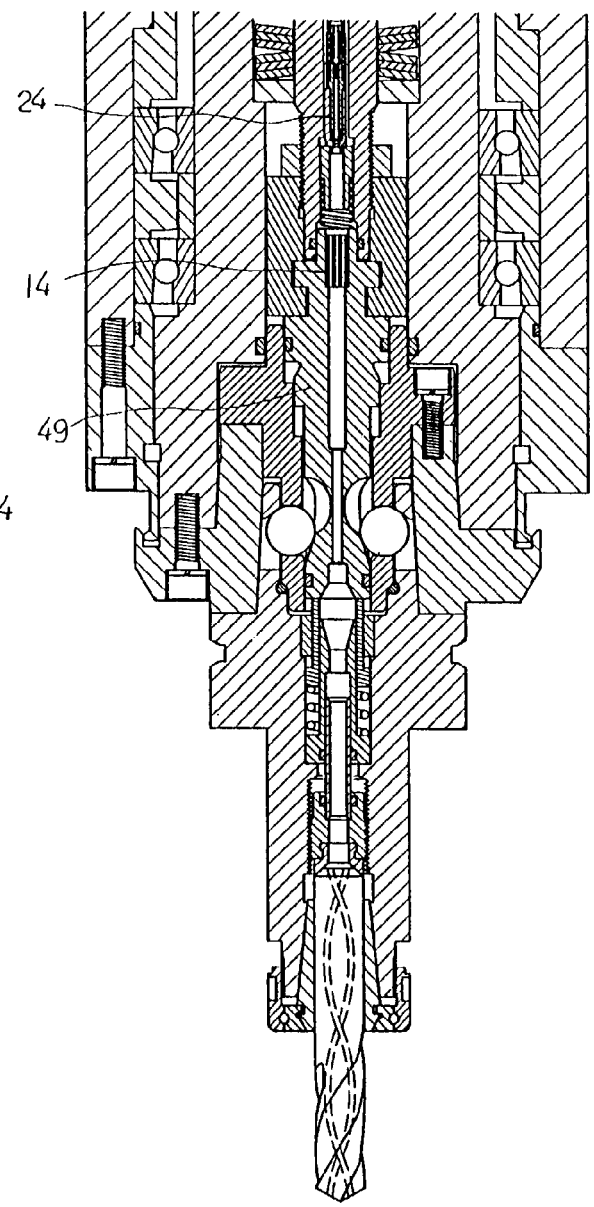

FIG. 8 illustrates a modification of this embodiment. In this modification, the straightening unit 14 is provided between the generator 24 and the tool holder 4 inside the spindle 1. Concretely, the columnar member 14a such as shown in FIG. 1C is innerly fitted and fixed inside the posterior part of the central hole of the clamp member 49 so that the small-diameter passages "h" are arranged in the same direction as the center of the cutting fluid passage e2 or the cutting fluid passage e1. On the other hand, the straightening unit 14 inside the tool holder 4 is removed.

Figure 9:
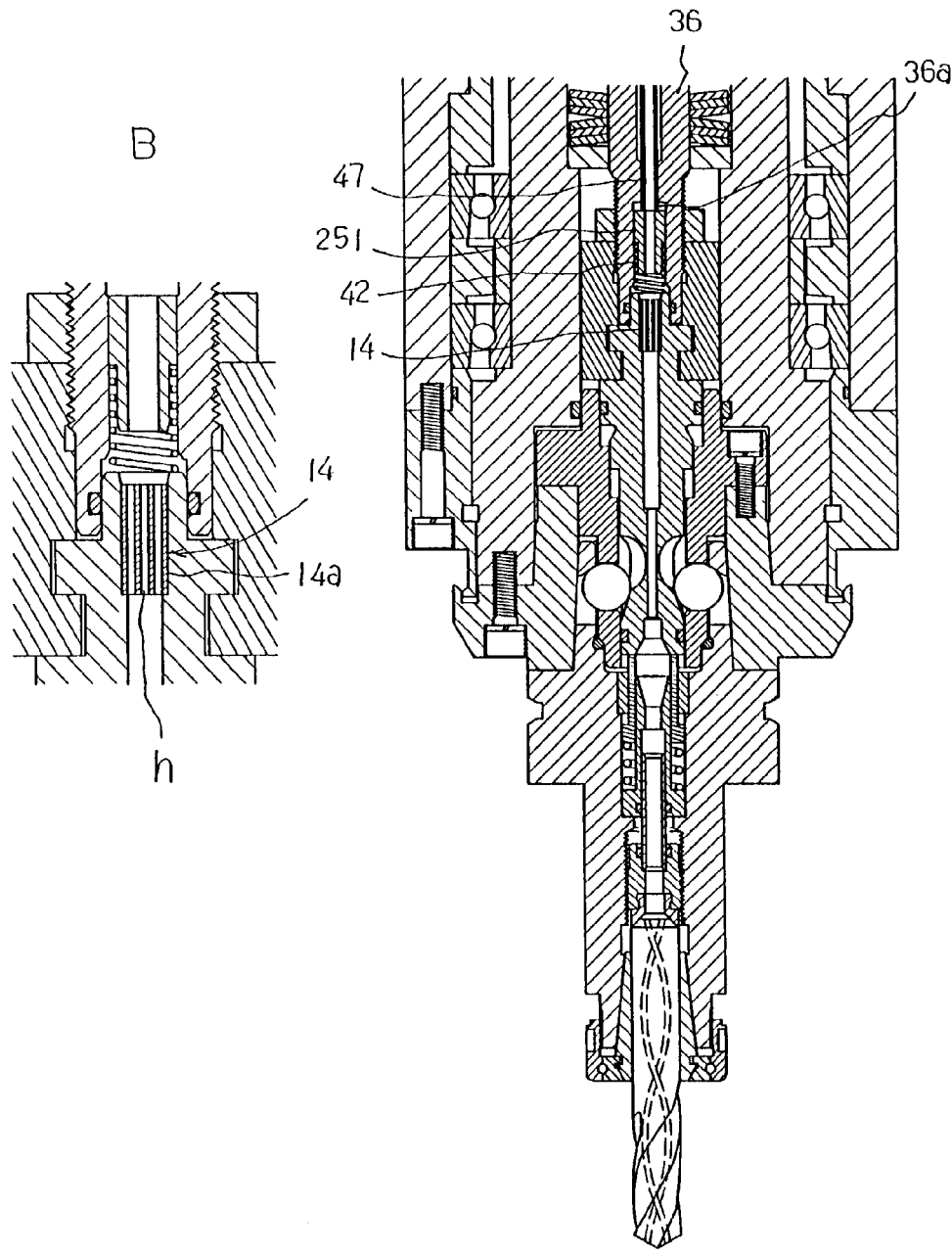
FIG. 9 illustrates another modified example of the fifth embodiment.

FIG. 9 illustrates an another modification of this embodiment. In this modification, the generator 24 and supply passages for supplying compressed air and cutting fluid are removed. An inner pipe 47 is provided inside the central hole of the draw bar 36 in one piece. Besides, instead of the valve 25, an extended connecting pipe member 251 in the same shape with the valve 25 is inserted inside a large-diameter part of the anterior part of the central hole of the draw bar 36 movably in a longitudinal direction. Here, a front end surface of the inner pipe 47 is pressed on a rear end surface of the connecting pipe member 251 by a spring 42, thereby connecting an inner hole of the inner pipe 47 to an inner hole of the clamp member 49. In use of the above-mentioned spindle device, supply of atomized cutting fluid and so on is carried out in accordance with the first embodiment.

Figure 10:
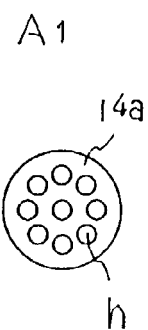
FIG. 10 is an explanatory view showing a comparison of a flow state of atomized cutting fluid in a straightening unit of each embodiment and that without a straightening unit.
Figure 10:
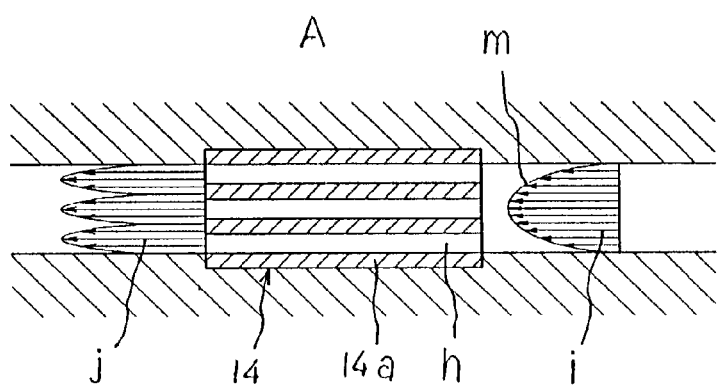
Figure 10:
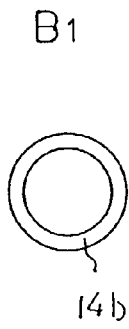
Figure 10:
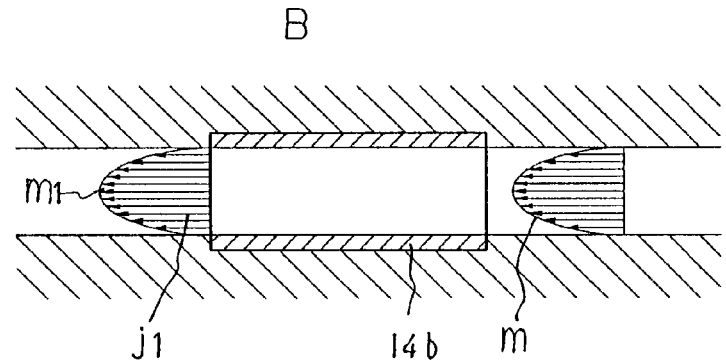
Figure 10:
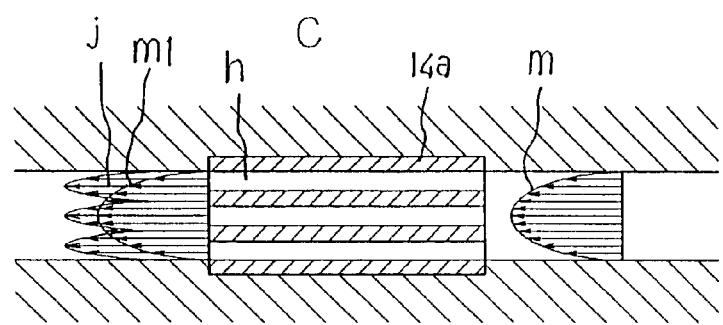
Figure 11:
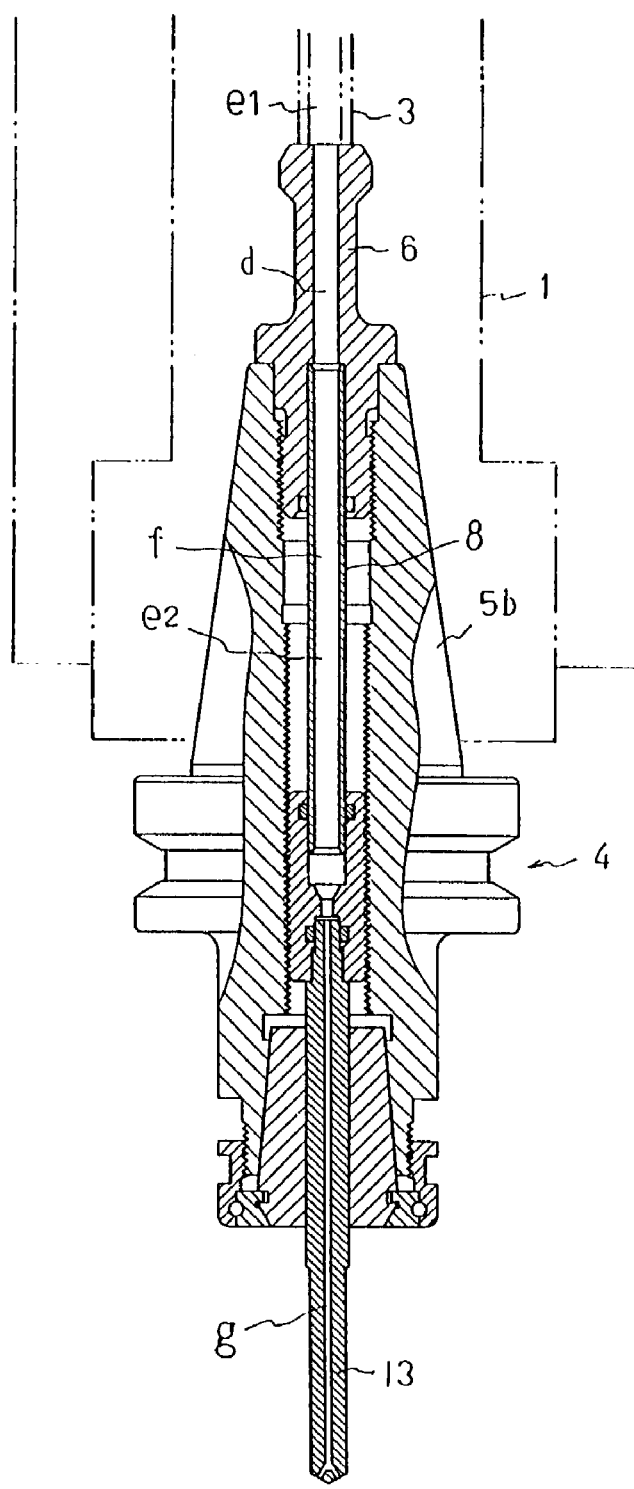
FIG. 11 is a sectional view from a side sight of a spindle device of conventional examples.

Next, in each of the above-mentioned embodiments, a flowing state that atomized cutting fluid passes around the straightening unit 14 will be explained with reference to FIG. 10. Here, FIG. 10 is an explanatory view of the flowing state of atomized cutting fluid in the straightening unit 14 in comparison with the case without the straightening unit 14.

When atomized cutting fluid supplied into the cutting fluid passage e1 flows toward the straightening unit 14, the section of the cutting fluid passage e1 or e2 is simple and comparatively large. Therefore, a line that links a head of velocity-vector "i" of atomized cutting fluid on each passage section turns into a parabola "m" as shown in FIG. 10A. Namely, the velocity in the center of the passage is large, and the velocity near the peripheral wall of the passage becomes remarkably small because of friction due to viscosity of the atomized cutting fluid or friction with the peripheral wall.

However, when atomized cutting fluid arrives near a cutting fluid entrance of the straightening unit 14, a part thereof is dammed up by the columnar member 14a, thereby equalizing an energy and movement of tiny elements in the whole passage section. Here, the atomized cutting fluid in such a state is divided and flown in each small-diameter passage "h".

Velocity-vector "j" in FIG. 10A shows atomized cutting fluid flown into each small-diameter passage "h". The atomized cutting fluid flows from a cutting fluid exit of the straightening unit 14 under a little dispersion of the velocity between the small-diameter passages "h". Since the sum of the passage sectional areas of all the small-diameter passages "h" is made smaller than a sectional area near the cutting fluid entrance or exit, the maximum of atomized cutting fluid which flows from the cutting fluid exit of the straightening unit 14 has an inclination to become large compared with that of a corresponding position of the cutting fluid entrance.

When the columnar member 14a of the straightening unit 14 is replaced with a cylindrical member 14b having the same section and the same length as the section of the cutting fluid passage e1 or e2 before and behind the straightening unit 14, a line that links a head of velocity-vector j1 showing an outflow velocity of atomized cutting fluid in each portion on the exit side of the straightening unit 14 is expressed in a parabola m1.

FIG. 10C illustrates the velocity-vector "j" in FIG. 10A and the velocity-vector j1 in FIG. 10B on a same drawing to compare each other.

Judging from FIG. 10C, an increasing rate of the flow velocity of atomized cutting fluid flown from the straightening unit 14 becomes large near the peripheral wall of the cutting fluid passage e1 or e2 specially. And the flow velocity near the peripheral wall of the cutting fluid passage e1 or e2 of an outflow side of the straightening unit 14 is increased wholly, thereby preventing atomized cutting fluid from liquefying on the peripheral wall of the passage. Besides, when the atomized cutting fluid flows from each small-diameter passage "h", an atomizing effect due to enlarging the passage occurs. This also effectively contributes to preventing atomized cutting fluid from liquefying.

Besides, the flow velocity of the whole section of the cutting fluid passage e1 or e2 of the outflow side of the straightening unit 14 is equalized, thereby enhancing a responsiveness between a supply start instruction or a supply stop instruction of atomized cutting fluid and an actual effective operation to the instruction.

According to the invention constituted like the above, the following effects are acquired.

According to the invention in claim 1, the flow velocity of atomized cutting fluid of the whole section inside the atomized cutting fluid passage in the cutting fluid exit side of the straightening unit is equalized. And besides, in the flow velocity of atomized cutting fluid near the peripheral wall of the atomized cutting fluid passage, the velocity upstream of the straightening unit becomes larger than that downstream thereof. Therefore, atomized cutting fluid can be stably ejected from the tip of the cutting tool. As a result, the liquefaction of atomized cutting fluid in the atomized cutting fluid passage downstream of the straightening unit is prevented, besides enhancing a responsiveness to an ejecting start or stop instruction as well as preventing a waste of cutting fluid. Besides, efficient and highly precise machining can be carried out.

According to the invention in claim 2, the cutting tool and the members relating thereto which are installed on the spindle can be kept in conventional structures.

According to the invention in claim 3, the atomized cutting fluid passage is shorten, thereby effectively preventing atomized cutting fluid from liquefying and enhancing a responsiveness to an ejecting start or stop instruction.

The invention claimed is:

1. A spindle device of a machine tool comprising:
   a spindle;
   a cutting tool mounted on said spindle;
   a first cutting fluid passage and a second cutting fluid passage, each said cutting fluid passage having a single-shape passage cross section,
   said first cutting fluid passage comprising an inner pipe, said inner pipe being positioned at a rotating center of the spindle;
   said second cutting fluid passage ranging from the first cutting fluid passage to the tip of the cutting tool, and
   a straightening unit comprising a columnar member having a plurality of small-diameter passages, said passages arranged with one small-diameter passage in the center and the other small-diameter passages disposed in a circle concentric with the center small-diameter passage,
   said straightening unit being positioned in either said first cutting fluid passage or said second cutting fluid passage, or both,
   wherein atomized cutting fluid supplied to said first cutting fluid passage is ejected from the cutting tool by way of the first and second cutting fluid passages and the straightening unit.

2. A spindle device of a machine tool as claimed in claim 1, wherein the columnar member of the straightening unit has a diameter of 5 to 8 mm, and each small-diameter passage has a diameter of 0.3 to 0.5 mm.

3. A spindle device of a machine tool as claimed in claim 1, wherein the straightening unit is positioned at an end of the first cutting passage.

4. A spindle device of a machine tool as claimed in claim 2, wherein the straightening unit is positioned at an end of the first cutting passage.

5. A spindle device of a machine tool as claimed in claim 1, wherein an atomized cutting fluid generator for generating atomized cutting fluid is provided in the first cutting passage.

6. A spindle device of a machine tool as claimed in claim 2, wherein an atomized cutting fluid generator for generating atomized cutting fluid is provided in the first cutting passage.

7. A spindle device of a machine tool as claimed in claim 1, wherein the small-diameter passages of the straightening unit have the same diameter size and are straight.

8. A spindle device of a machine tool as claimed in claim 2, wherein the small-diameter passages of the straightening unit have the same diameter size and are straight.

* * * * *